United States Patent [19]

Bechet

[11] Patent Number: 4,809,195

[45] Date of Patent: Feb. 28, 1989

[54] STORING AND RECONSTITUTING ANALOG SIGNALS USING DATA COMPRESSION

[75] Inventor: Louis Bechet, Douvaine, France

[73] Assignee: Battelle Memorial Institute, Carouge/Geneva, Switzerland

[21] Appl. No.: 856,154

[22] Filed: Apr. 25, 1986

[30] Foreign Application Priority Data

Apr. 26, 1985 [CH] Switzerland .................. 1787/85

[51] Int. Cl.[4] .............................................. G06K 9/34
[52] U.S. Cl. ..................................... 364/518; 364/521; 382/3
[58] Field of Search .................. 364/518, 520, 521; 340/703, 723, 729; 382/3

[56] References Cited

U.S. PATENT DOCUMENTS

| | | | |
|---|---|---|---|
| 4,491,906 | 1/1985 | Kishi et al. | 364/520 X |
| 4,553,258 | 11/1985 | Chainer et al. | 382/3 |
| 4,597,101 | 6/1986 | Kishimoto et al. | 382/3 X |
| 4,622,641 | 11/1986 | Stephens | 364/518 |
| 4,688,182 | 8/1987 | Schrieber | 364/518 X |
| 4,701,960 | 10/1987 | Scott | 382/3 |

FOREIGN PATENT DOCUMENTS

| | | |
|---|---|---|
| 0030234 | 2/1983 | European Pat. Off. |
| 58-163080 | 9/1983 | Japan . |
| 2114851 | 2/1983 | United Kingdom . |

OTHER PUBLICATIONS

IBM Technical Disclosure Bulletin, vol. 15, No. 4, Sep. 1972, p. 1151.
Hanaki et al., "An On-Line Character Recognition Aimed at a Substitution for a Billing Machine Keyboard", vol. 8, pp. 63-71, 1976.
Esteban et al., "Quadratic Interpolation Used as Low-Pass Filter", IBM Technical Disclosure Bulletin, vol. 16, No. 12, May 1974, pp. 3947-3949.
"Signature Verifier Exploits Writing Speed", 8032 Electronics International, vol. 56 (1983), Jul., No. 15.

Primary Examiner—Gary V. Harkcom
Assistant Examiner—H. R. Herndon
Attorney, Agent, or Firm—Cushman, Darby & Cushman

[57] ABSTRACT

A method for storing compressed data indicative of an analog signal and reproducing that analog signal from the compressed data. The analog signal to be stored is superimposed on a rectangular coordinate system. An elementary interval is defined on the X-axis of an X-Y coordinate system for the selection of a first series of points, a second series of points ($R_1$, $R_2$, $R_3$) is determined by establishing a threshold ratio between the chord ($C_1$, $C_1'$) separating two non-consecutive points and the sum of the chords ($C_1$, $C_2$, $C_3$; $C_1'$, $C_2'$, $C_3'$) separating each of the consecutive points within two non-consecutive points. An interval (N) between these two non-consecutive points is selected to correspond to the maximum ratio below this threshold. The analog signal is reconstituted by generating a signal having a curve that is plotted by establishing between each group of three non-consecutive points a parabola with respect to the axis of symmetry corresponding to the axis of the elementary intervals.

9 Claims, 3 Drawing Sheets

STORING AND RECONSTITUTING ANALOG SIGNALS USING DATA COMPRESSION

BACKGROUND OF THE INVENTION

The present invention relates to a method for the numerical storage of an analog curve of a system of rectangular coordinates X Y in a memory and plotting of a curve representative of this analog curve from the stored values.

It has already been proposed in the European Patent Specifications No. 0030234 to record handwriting speed signals, particularly of a reference signature, using a system of rectangular coordinates so as to enable the comparison of these signals with a further signature to ascertain whether the writer of the signature is the same in both cases. This comparison is designed to be carried out using computer techniques.

The characteristic speed signals of the reference are in general intended to be recorded in a memory formed by a magnetic stripe or a chip placed on a card which is normally in the possession of the cardholder. If the cardholder is not the writer of the signature, it would not be possible for this fraudulent cardholder to write a signature having speed signals comparable to those of the reference, even if he has practised copying the way in which the signature is written in an accurate way. Storage of the signature raises the problem of space, as the magnetic strip or chip has to contain other information. If it is desired to preserve the speed signals of the reference signature with sufficient accuracy, no memory card would have sufficient space for the storage of the analog speed signal data in a numerical form from which these signals could then be accurately reproduced. If the sampling carried out for storage does not provide sufficiently accurate information, the comparison carried out using this reference would be of little use since the reproduction of the reference for the purposes of the comparison would not provide an accurate picture of the genuine model.

The object of the present invention is to enable the accurate recording of these reference signals with a number of numerical data which is sufficiently small to be recorded either on a magnetic stripe or on a chip of a memory card of the credit card type.

SUMMARY OF THE INVENTION

For this purpose, the invention relates to a method for the numerical storage of an analog curve of a system of rectangular coordinates X Y in a memory and plotting of a curve representative of this analog curve from the stored values, characterised in that an elementary interval (T) is defined on one of the axes (X) of the coordinate system for the selection of a first series of points, this elementary interval (T) providing points which are sufficiently close together to enable them to be connected up to give a curve similar to the initial curve, in that a second series of points is plotted by establishing a threshold ratio between the chord separating two-non-consecutive points and the sum of the chords separating each of the consecutive points within the two non-consecutive points and in that the interval between these two non-consecutive points is selected to correspond to the maximum ratio below the threshold, in that the address of the points of each group of three non-consecutive points determined in this way is established as well as the number of elementary intervals (T) between them and their amplitudes ($a_1$, $a_2$ and $a_3$) which are recorded in the memory, as well as the address and the amplitude of the isolated points which do not come within a group of three non-consecutive points and in that the representative curve is then plotted by establishing between each group of three non-consecutive points a parabola with respect to an axis of symmetry corresponding to the axis of the elementary intervals from the equation:

$$Y_{(T)} = AT^2 + BT + C$$

in which:
$A = (a_1 + a_3 - 2a_2)/2T^2$
$B = (a_3 - a_1)/2T$
$C = a_2$

The proposed method is advantageous in that once the initial curve, representing preferably speed components of a signature, has been "compressed", it can be "decompressed", reproducing the initial curves of these components very accurately such that the comparison between these "decompressed" curves and those of the signature to be identified is not affected by this method of storage of the reference.

BRIEF DESCRIPTION OF THE DRAWINGS

The attached drawings show an embodiment of the method of the present invention in diagrammatic form and by way of example. In the drawings.

DESCRIPTION OF PREFERRED EMBODIMENTS

In order to store an analog signal in the form of numerical data, it is necessary to solve the problem of selecting a representative sample of points along this curve so as to enable reproduction with a sufficient degree of accuracy. It is obviously possible to select a large number of points at very small intervals thus guaranteeing an acccurate reproduction of the curve. However, storage of this type takes up too much space in the memory when it is formed by a magnetic stripe on a credit card or a chip designed to contain other information.

For this reason the smallest possible number of points needs to be selected in a discriminating way so as to ensure that these points enable a sufficiently accurate reproduction of the initial curve. The first step is to locate points on the curve at predetermined intervals enabling an accurate reproduction of the curve. The second step is to select the smallest number of points from those initially located by means of selection criteria which enable the reproduction of the initial curve with a degree of accuracy linked to the selection criteria chosen. These selection criteria are called compression ratios. The higher the ratio the less information needs to be stored, although inaccuracy in the reproduction of the curve is proportional to the compression ratio. A compromise must therefore be made and entails calculating a compression ratio which limits inaccuracy in each individual case.

Figure 1:
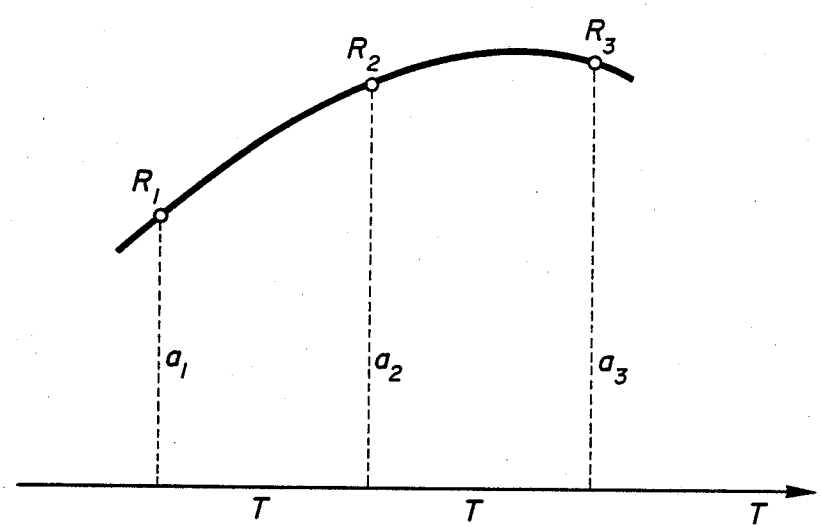
FIGS. 1 and 2 are explanatory diagrams of the method used in the present invention.

The slection method chosen in this case is based on parabolic interpolation. This is a method which is well suited to the selection of characteristic points of a curve since there is always a parabola which passes through any three non-aligned points in a plane. If these points are not selected in any way but with respect to an axis of symmetry, parabolic interpolation provides the selection criteria with an advantageous property. Looking at FIG. 1, the parabola which passes through the three points $R_1$, $R_2$ and $R_3$ whose x values are separated by a time constant T and whose amplitudes are respectively $a_1$, $a_2$ and $a_3$, the equation of the parabola is:

$$Y(T) = AT^2 + BT + C$$

If the x values of the central point $R_2$ are taken as time origins for the calculation of the parabola, the amplitudes of the three points may be expressed by the following relationships:

$$a_1 = AT^2 - BT + C$$

$$a_2 = C$$

$$a_3 = AT^2 + BT + C$$

The coefficients A, B and C of the parabola are deduced from these three equations:

$$A = (a_1 + a_3 - 2a_2)/2T^2$$

$$B = (a_3 - a_1)/2T$$

$$C = a_2$$

It is interesting to note that the three coefficients of the parabola may be calculated from a minimum of information, i.e., the amplitudes $a_1$, $a_2$ and $a_3$ of these three points and the time interval T of these points.

The selection of the points of the curve to be stored is a function of the time intervals selected. The criteria on the basis of which these intervals are calculated will now be examined. For this purpose, it is necessary to decide what characteristics of the curve it is desired to retrieve with the maximum accuracy. In the case of the signature, the position of the points must be retrieved with a minimum deviation.

Figure 2:
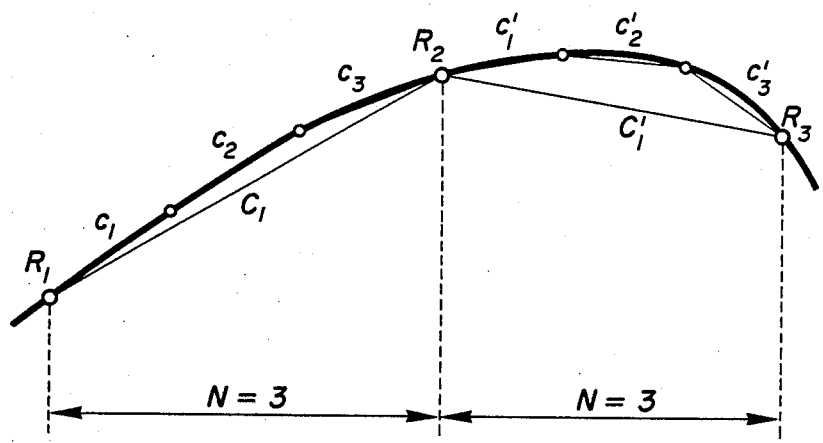

The criterion which provides the best result for this purpose is that of the chord. The test is shown in FIG. 2. It entails establishing a ratio between the chord $C_1$, $C_1'$ separating two non-consecutive points such as $R_1$, $R_2$, $R_3$ and the sum of the chords $c_1$, $c_2$, $c_3$ and $c_1'$, $c_2'$, $c_3'$ respectively of the consecutive points of the curve. When the relationship exceeds a predetermined threshold, the interval between two non-consecutive points is reduced by an elementary interval separating two consecutive points and the interval whose ratio is just below this threshold is selected as the selection interval for points on the curve. This threshold is determined as a function of the accuracy with which the curve may subsequently be reproduced.

The practical application of these selection criteria will be explained in detail below with reference to the flow chart.

The speed signals of the reference signature are recorded in the form of two curves corresponding to the speed components VX and VY on two rectangular coordinate axes. It is thus possible to envisage applying the selection method to each of the curves VX and VY separately. However, an operation of this type is not justified for several reasons. The method of comparing the reference with the signature is not carried out using separate components but rather by combining these two components to form a hodograph. Processing of each speed component would entail double the calculation work. For a same accuracy criterion, the "compression ratio" obtained would be lower for each component than that obtained in the hodograph.

Figure 3:
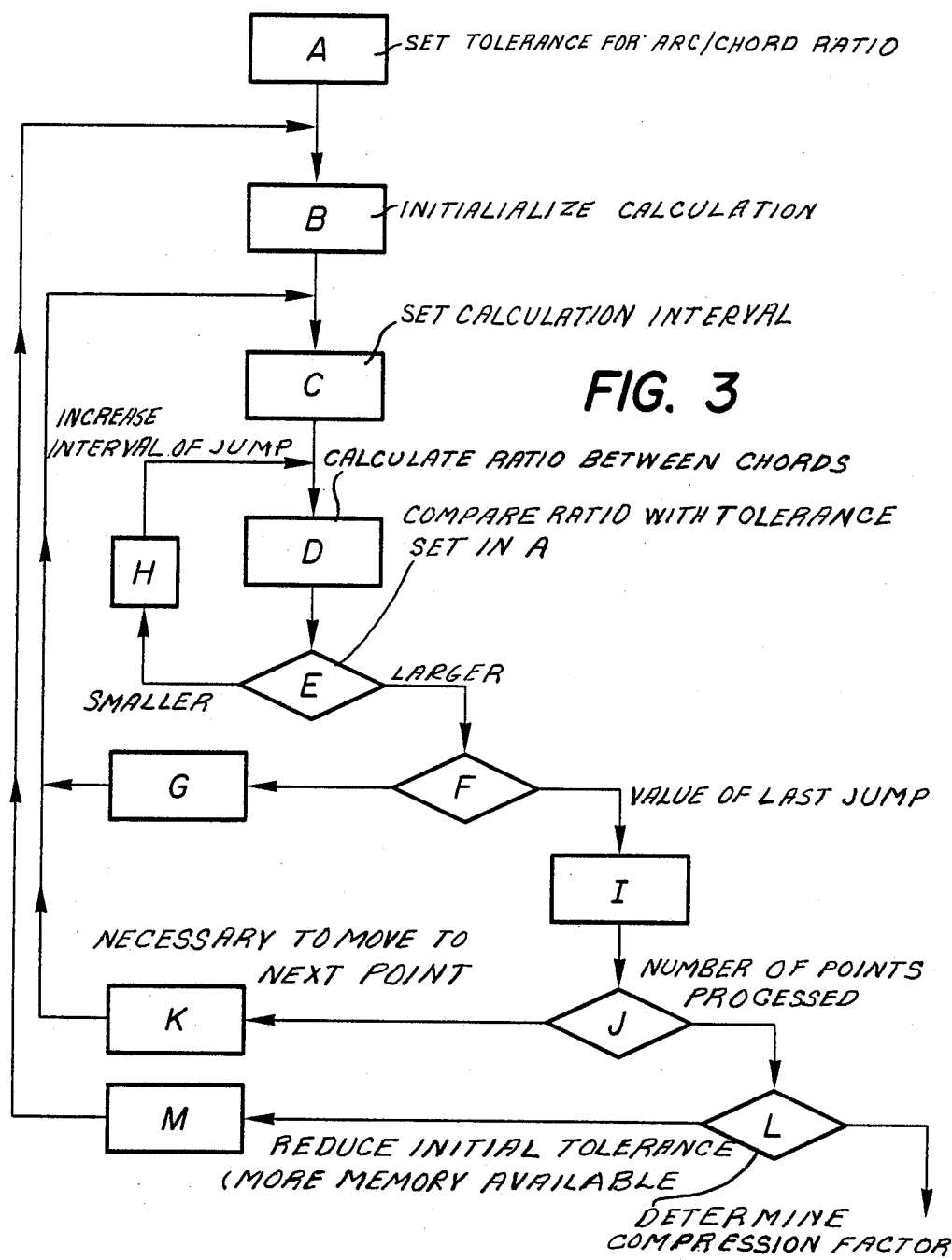
FIG. 3 is a flow chart of the computer processing method used for the application of the method.

The method used to select a predetermined number of points will now be examined with reference to the flow chart of FIG. 3.

The rectangle A sets a tolerance for the arc/chord ratio which is used to calculate the admissible interval between the different points selected. The hodograph of the reference signal whose duration is limited to 2.4 s. is previously divided into 120 points spaced, therefore, by 0.01 s. which corresponds to the initial time interval T. The objective is to select 72 points. Rectangle B corresponds to the initialisation of the calculation and rectangle C sets a first calculation interval which corresponds to a jump of two spaces, i.e. from point 1 to point 3. The calculation of the ratio between the sum of the chords from point 1 to point 2 and from point 2 to point 3 and the chord from point 1 to point 3 is then calculated in rectangle D.

The decision diamond E establishes whether the ratio calculated in this way is smaller or larger than the maximum tolerance laid down initially in rectangle A. If this ratio is larger, the right-hand branch of diamond E is activated and diamond F informs rectangle G that the jump of 2 spaces has been rejected, and the attempt to jump from point 1 to point 3 is thus abandoned such that there is a passage from point 1 to point 2 and a return to rectangle C which commands a jump of two intervals, i.e. from point 2 to point 4, and the calculation operation for the ratio of the chords is recommenced in rectangle D and followed by a tolerance test in diamond E. If this ratio is smaller than the tolerance which has been laid down, the left-hand branch of diamond E is activated and the rectangle H commands an increase of one interval in the jump. If the tolerance test in diamond E shows this time that the ratio is greater than the tolerance, the right-hand branch of diamond E is activated and moves on to diamond F. If the jump for which the ratio of the chords is greater than the tolerance is greater than 2, the right-hand branch of diamond F is activated and transmits the value of the last jump for which the ratio of the chords is lower than the tolerance and memorised in the rectangle H to the storage rectangle I for the selected values. This rectangle I informs the diamond J of the number of points which have been processed up to now. If this number is less than 120 in this example the left-hand branch of the diamond J is activated and informs the rectangle K that it is necessary to move on to the next point. The same operation as described above is repeated between the points 4, the last point selected in this example, and 6. When the number of intervals from point 4 has been determined by the loop D, E, H, the new point selected is transmitted to diamond F then to the rectangle I. When the diamond J indicates that all 120 points have been examined, the ratio between the number of initial points and that of the points selected is calculated in diamond L to establish the value of the overall compression factor. If this factor shows that the compression is too great, i.e., that the memory still has space for the 72 points laid down in this example, the left-hand branch of diamond L is activated and informs rectangle M that the initial tolerance should be reduced to increase the number of points selected.

The entire process described above is recommenced on the basis of the new tolerance and continues until the compression factor reaches a predetermined value.

The attached table shows seven points of the original hodograph with the values VX and VY at the respective instants $t_1$ to $t_7$ on the left, and the values of the points selected on the right with the number of intervals T separating these points opposite. During reproduction of the original curve, the three points selected make it possible to trace a parabola with respect to the axis of symmetry forming the abscissa of the curve to be plotted, given that the amplitude of these three points and their deviation are known.

| VX | VY | VX* | VY* | T |
|---|---|---|---|---|
| X (t1) | Y (t1) | X (t1) | Y (t1) | 3 |
| X (t2) | Y (t2) | | | |
| X (t3) | Y (t3) | | | |
| X (t4) | Y (t4) | X (t4) | Y (t4) | |
| X (t5) | Y (t5) | | | |
| X (t6) | Y (t6) | | | |
| X (t7) | Y (t7) | X (t7) | Y (t7) | |

Figure 4:
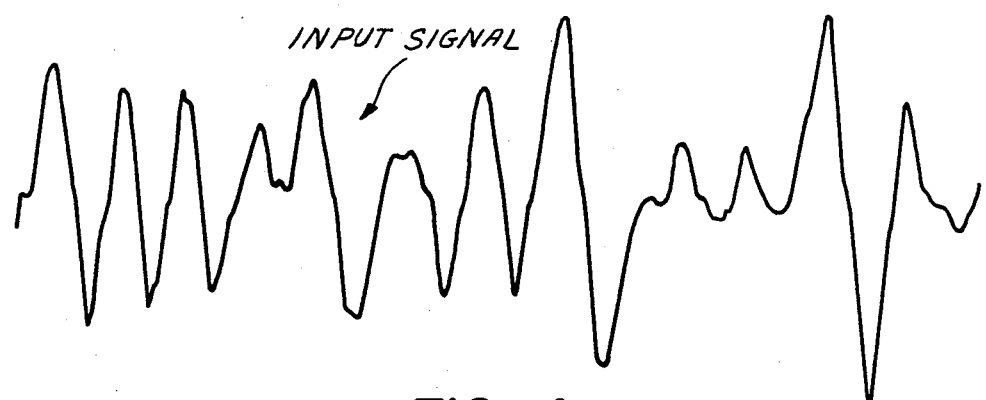
FIGS. 4 and 6 are explanatory diagrams.

The diagram of FIG. 4 shows the speed signal forming the reference and which is desired to be stored in the numerical form of a selection of points chosen to enable a reproduction which is as accurate as possible with a small number of points.

Figure 5:
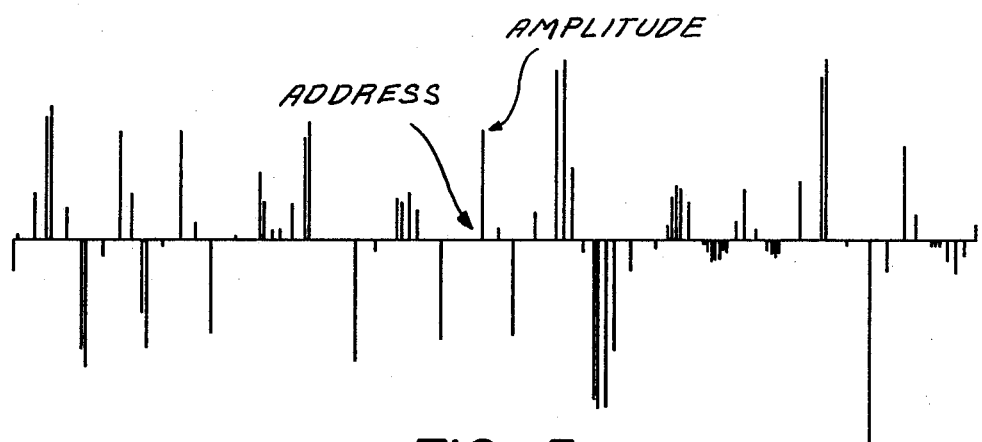

The diagram of FIG. 5 shows the different points selected from this curve using the selection method described above and applying the chord ratio criterion.

Figure 6:
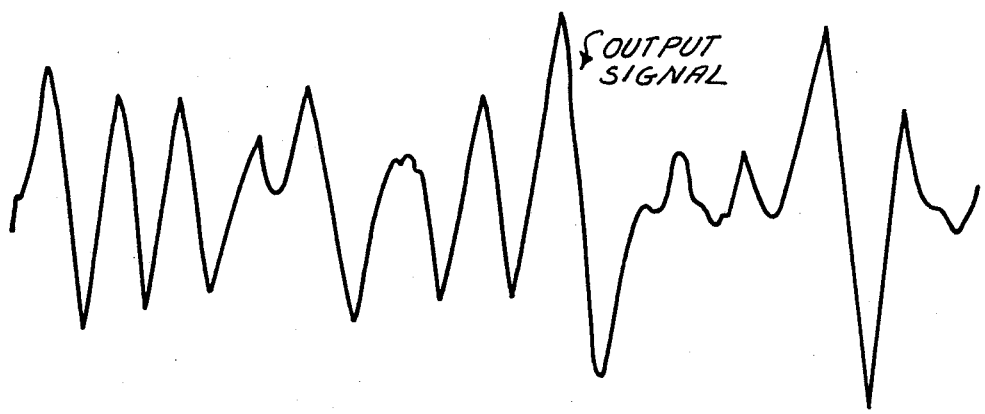

The diagram of FIG. 6 shows the curve of the speed signal using the parabolic interpolation technique with each group of three non-consecutive points spaced by an equal number of intervals. The isolated points, i.e. those which it has not been possible to "compress" are reproduced separately and linked to the parabolas by straight-line segments. It will be noted that this curve is extremely similar to the initial curve of FIG. 3 such that the comparison to be made with respect to this curve may be carried out without introducing an error likely to falsify this comparison.

I claim:

1. A method for storing data indicative of an input analog signal in the form of rectangular coordinates X and Y values in a memory and producing an output signal substantially identical to the input analog signal from the stored data, comprising the steps of:
    defining an elementary interval (T) on an X-axis of an X-Y coordinate system on which the input analog signal is superimposed and selecting a first series of points separated along the X-axis by interval T, interval (T) providing points which are sufficiently close together to enable them to be connected to form a curve similar to the curve of the input signal;
    selecting a second series of points which is a subset of the first series by establishing a threshold ratio between a chord separating two non-consecutive points and the sum of chords separating each of the consecutive points within the two non-consecutive points; and
    selecting an interval between these two non-consecutive points to correspond to the maximum ratio below the threshold, in that the address of the points of each group of three non-consecutive points determined in this way is established as well as the number of elementary intervals (T) between them and their respective amplitudes ($a_1$, $a_2$ and $a_3$);
    storing in a memory, the address and the amplitude, which are the X and Y values, of the isolated points which do not come within a group of three non-consecutive points; and
    generating, from the data previously stored in memory, an output analog signal corresponding to the input analog signal by establishing between each group of three-non-consecutive points a parabola with respect to an axis of symmetry corresponding to the axis of the elementary intervals from the equation:

$$Y_{(T)} = AT^2 + BT + C$$

in which:
A = $(a_1 + a_3 - 2a_2)/2T^2$
B = $(a_3 - a_1)/2T$
C = $a_2$.

2. A method according to claim 1 further comprising the steps of:
    fixing a ratio between the number of points in the first series and the number of points in the second series,
    calculating the ratio between the number of points in the first series and the number of points selected to constitute the second series,
    adjusting the aforesaid threshold ratio value in dependence on the calculated ratio between the numbers of points in the first and second series, in such a manner as to adjust the calculated ratio towards the first mentioned fixed ratio between the numbers of points, and
    repeating the determination of the points constituting the second series using the adjusted threshold ratio value, until the actual ratio between the number of points in the first series ad the number of points in the second series corresponds to the fixed ratio therebetween.

3. A method for numerically storing in a memory medium data representing an analog curve in a system of rectangular coordinates, comprising the steps of:
    generating a signal indicative of the analog curve;
    defining on one axis of the coordinate system, an elementary interval, and selecting on the curve a first series of consecutive points spaced apart by the elementary interval, the elementary interval being such as to provide points on the curve sufficiently close together that when the points are connected by chords a curve similar to the analog curve is obtainable;
    determining a threshold value for the ratio between the length of the chord separating two non-consecutive points of the first series of points, and the sum of the chords respectively separating each of the consecutive points within the two non-consecutive points;
    determining values of the ratio for points of the first series;
    comparing the ratio values with the threshold value and selecting non-consecutive points so that the interval therebetween provides the maximum value of the ratio below the threshold;
    defining a second series of points comprising each group of three non-consecutive points determined by the comparison and selection together with those points of the first series that do not come within a group of three non-consecutive points; and storing data in a memory medium indicative of the addresses of the points of each group of three non-consecutive points as well as the number of elementary intervals between the non-consecutive points and the amplitudes of the non-consecutive points, and storing the address and amplitude which are the X and Y values, of each of the isolated points.

4. A method according to claim 3 further including the step of:

generating a second analog signal representative of the first analog signal, from the stored values of the points of the second series, the shape of the signal being formed by plotting the groups of three non-consecutive points and the isolated points, and establishing between each group of three non-consecutive points a respective parabola about an axis of symmetry corresponding to the axis of the elementary intervals, and determining the parabola from the equation $$Y_{(T)} = AT^2 + BT + C$$

in which:
$A = (a_1 + a_3 - 2a_2)/2T^2$
$B = (a_3 - a_1)/2T$
$C = a_2$ and in which $A_1$, 2 and a3 are the respective amplitudes of the points of the group of three non-consecutive points, and T is the magnitude of the elementary interval.

5. A method for storing data indicative of an input handwriting hodograph signal in the form of rectangular coordinates X and Y values in a memory and producing an output hodograph signal substantially identical to the input signal from the stored values, comprising the steps of:

superimposing the input hodograph signal on an X-Y coordinate system;

defining an elementary interval (T) on the X-axis of the coordinate system;

selecting a first series of points along the input hodograph signal, the points being spaced by interval T, interval (T) providing points which are sufficiently close together to enable them to be connected to form a curve similar to the curve of the input signal selecting a second series of points by establishing a threshold ratio between a chord separating two non-consecutive points within the two non-consecutive points and selecting an interval between these two non-consecutive points to correspond to the maximum ratio below the threshold, in that the address of the ponts of each group of three non-consecutive points determined in this way is established as well as the number of elementary intervals (T) between them and their respective amplitudes ($a_1$, 2 and a3); storing in a memory, the address and the amplitude, which are the X and Y values, of the isolated points which do not come within a group of three non-consecutive points; and generating, from the data previously stored in memory, the output hodograph signal corresponding to the input hodograph signal by generating a signal having a shape determined as follows - establishing between each group of three non-consecutive points a parabola with respect to an axis of symmetry corresponding to the axis of the elementary intervals from the equation:

$$Y_{(T)} = AT^2 + BT + C$$

in which:
$A = (a_1 + a_3 - 2a_2)/2T^2$
$B = (a_3 - a_1)/2T$
$C = a_2$.

6. A method for numerically storing in a memory medium data representing an input handwriting hodograph analog signal in a system of rectangular coordinates, comprising the steps of:

generating the input hodograph signal;

superimposing the input hodograph signal on an X-Y coordinate system;

defining an elementary interval (T) on the X-axis of the coordinate system;

selecting a first series of points along the input hodograph signal, the points being spaced by interval T, interval (T) providing points which are sufficiently close together to enable them to be connected to form a curve similar to the curve of the input signal;

determining a threshold value for a ratio between the length of the chord separating two non-consecutive points of the first series of points, and the sum of the chords respectively separating each of the consecutive points within the two non-consecutive points;

determining values of the ratio for points of the first series;

comparing the ratio values with the threshold value and selecting non-consecutive points so that the interval therebetween provides the maximum value of the ratio below the threshold;

defining a second series of points comprising each group of three non-consecutive points determined by the comparison and selection together with those points of the first series that do not come within a group of three non-consecutive points; and storing data in a memory medium indicative of the addresses of the points of each group of three non-consecutive points as well as the number of elementary intervals between the non-consecutive points and the amplitudes of the non-consecutive points, and storing the address and amplitude of each of the isolated points.

7. A method according to claim 6 further including the step of:

generating an output hodograph signal representative of the input hodograph signal, from the stored values of the points of the second series, comprising the step of plotting the groups of three non-consecutive points and the isolated points, and establishing between each group of three non-consecutive points a respective parabola about an axis of symmetry corresponding to the axis of the elementary intervals, and determining the parabola from the equation $$Y_{(T)} = AT^2 + BT + C$$

in which:
$A = (a_1 + a_3 - 2a_2)/2T^2$
$B = (a_3 - a_1)/2T$
$C = a_2$ and in which $a_1$, $a_2$ and $a_3$ are the respective amplitudes of the points of the group of three non-consecutive points, and T is the magnitude of the elementary interval.

8. A method for storing compressed data indicative of an input analog sinal, comprising the steps of:
  A. establishing an X-Y coordinate system with respect to the input analog signal, so that each point of the input analog signal can be described by an X,Y pair;
  B. defining an elementary interval T along the X-axis, the X-Y pairs corresponding to the X values spaced at interval T constituting a first set of X,Y pairs, interval T being chosen such that the first set of X,Y pairs, if connected, would substantially reconstitute the input signal;
  C. selecting from said first set of X, Y pairs, a subset of X,Y pairs to be stored in a storage medium, selection being carried out in accordance with steps (a)–(l), beginning with a first point $X_0$, $Y_0$ as follows:
    (a) establish a tolerance arc/chord ratio;
    (b) initialize calculation;
    (c) establish a jump interval which corresponds to a jump of a predetermined number of elementary intervals T along the X axis from $X_0$, $Y_0$;
    (d) determine the length of a chord $C_1$ from the current point being tested to the point determined by the jump interval, and determine the lengths of chords $c_1$, $c_2$, etc. from one point to the next beginning with the current point being tested to the point determined by the jump interval, and determine ratio between the sum of chords $c_1$, $c_2$, etc. and chord $c_1$,
    (e) compare the ratio determined in step (d) with the tolerance established in step (a), if the ratio detemined in step (d) is larger than the tolerance established in step (a), go to step (f), but if the ratio determined in step (d) is smaller than the tolerance established in step (a), go to step (h);
    (f) if the jump for which the ratio of the chords is greater than the tolerance is greater than 2, memorize the interval of the last jump for which the ratio of the chords is lower than the tolerance (noted at step (h)), however, if the jump is rejected, go to step (g),
    (g) return to step (c)
    (h) increase the jump interval established in step (c) by one and return to step (d),
    (i) note the jump interval determined at step (f) and note the number of points processed up to now.
    (j) if all points have not yet been processed ,go to step (k), otherwise, go to step (l);
    (k) return to step (c);
    (l) determine a value of an overall compression factor by comparing the number of points selected for the subset with the total number of points based on the elementary interval T and if the compression factor is greater than a predetermined amount, such that there is memory in the storage medium available, go to step (m); and
    (m) reduce the initial tolerance set at step (a) to increase the number of points selected for the subset and return to step (b), the process recommencing on the basis of the new tolerance and continuing until the compression factor reaches a predetermined value; and
  D. storing in the storage medium data indicative of the X, Y pairs of the subset.

9. A method for storing compressed data indicative of an input analog sinal and generating an output signal from the stored data corresponding to the input signal, comprising the steps of:
  A. establishing an X-Y coordinate system with respect to the input analog signal, so that each point of the input analog signal can be described by an X, Y pair;
  B. defining an elementary interval T along the X-axis, the X, Y pairs corresponding to the X values spaced at interval T constituting a first set of X, Y pairs, interval T being chosen such that the first set of X,Y pairs, if connected, would substantially reconstitute the input signal;
  C. selecting from said first set of X, Y pairs, a subset of X, Y pairs to be stored in a storage medium, selection being carried out in accordance with steps (a)–(l), beginning with a first point $X_0$, $Y_0$ as follows:
    (a) establish a tolerance arc/chord ratio;
    (b) initialize calculation;
    (c) establish a jump interval which corresponds to a jump of a predetermined number of elementary intervals T along the X-axis from $X_0$, $Y_0$;
    (d) determine the length of a chord $C_1$ from the current point being tested to the point determined by the jump interval, and determine the lengths of chords $c_1$, $c_2$, etc. from one point to the next beginning with the current point being tested to the point determined by the jump interval, and determine ratio between the sum of chords $c_1$, $c_2$, etc. and chord $c_1$,
    (e) compare the ratio determined in step (d) with the tolerance established in step (a), if the ratio determined in step (d) is larger than the tolerance established in step (a), go to step (f), but if the ratio determined in step (d) is smaller than the tolerance established in step (a), go to step (h);
    (f) if the jump for which the ratio of the chords is greater than the tolerance is greater than 2, memorize the interval of the last jump for which the ratio of the chords is lower than the tolerance (noted at step (h)), however, if the jump is rejected, go to step (g),
    (g) return to step (c)
    (h) increase the jump interval established in step (c) by one and return to step (d),
    (i) note the jump interval determined at step (f) and note the number of points processed up to now;
    (j) if all points have not yet been processed, go to step (k), otherwise, go to step (l);
    (k) return to step (c);
    (l) determine a value of an ovreall compression factor by comparing the number of points selected for the subset with the total number of points based on the elementary interval T and if the compression factor is greater than a predetermined amount, such that there is memory in the storage medium available, go to step (m); and
    (m) reduce the initial tolerance set at step (a) to increase the number of points selected for the subset and return to step (b), the process recommencing on the basis of the new tolerance and continuing until the compression factor reaches a predetermined value;
  D. storing in the storage medium data indicative of the X, Y pairs of the subset; and
  E. from the subset of X, Y pairs, generating an output analog signal substantially identical to the input analog signal by using parabolic interpolation to fit a curve to the various points of the subset.

* * * * *